April 12, 1932.  J. M. CLARK  1,854,108
SIGNAL DEVICE FOR AUTOMOBILES.
Filed June 26, 1931
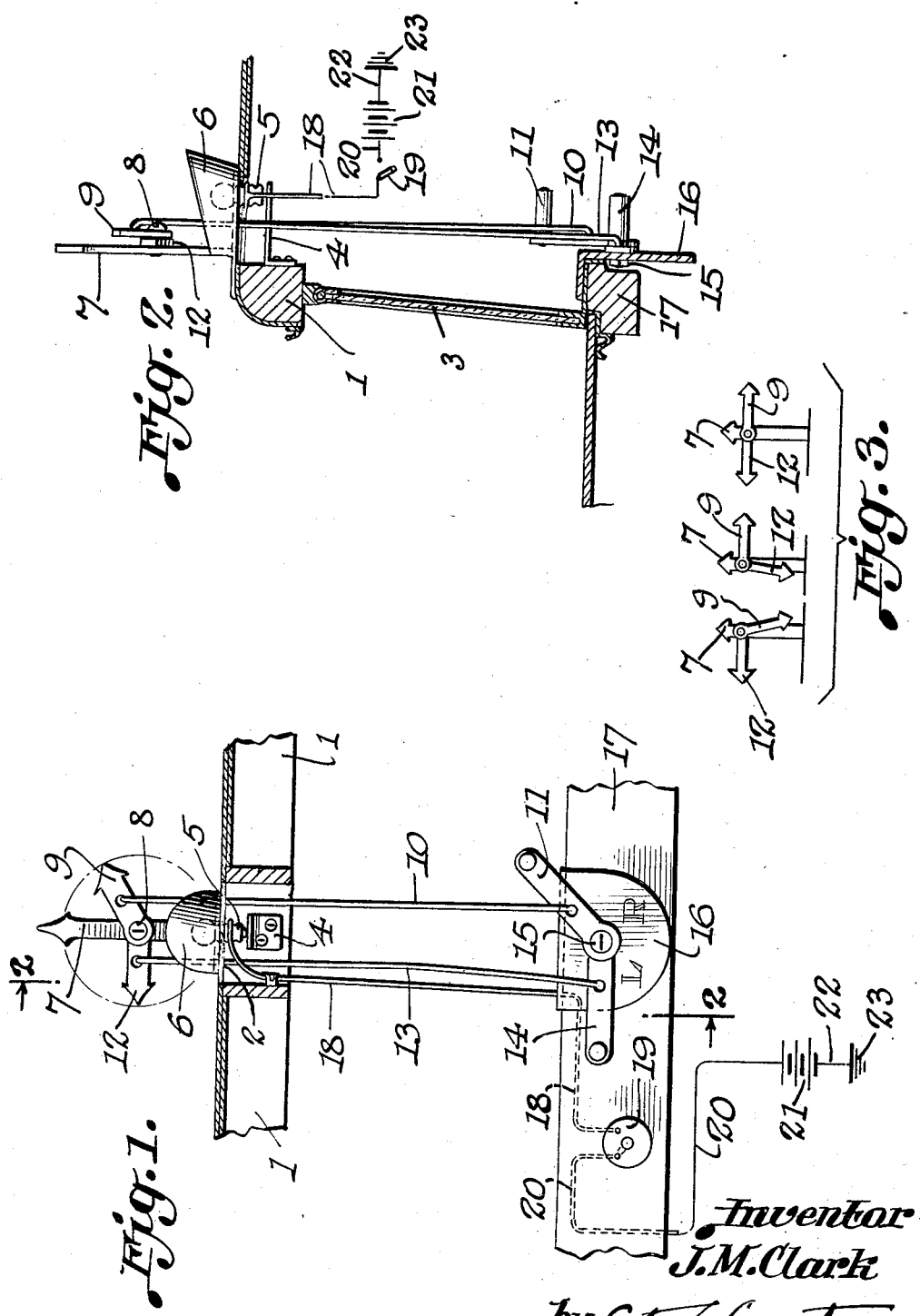

Patented Apr. 12, 1932

1,854,108

UNITED STATES PATENT OFFICE

JOHN M. CLARK, OF NORTON, KANSAS

SIGNAL DEVICE FOR AUTOMOBILES

Application filed June 26, 1931. Serial No. 547,121.

The object of my invention is to provide a novel signal device for automobiles to be positioned in a novel location on the top of the car to provide simple and novel means for operating the signal and to provide means for illuminating the signal at night. I attain the objects of my invention by the device illustrated in the accompanying drawings, in which—

Figure 1 is a front elevation of my invention applied to an automobile, the member 1 designating the roof of the car;

Fig. 2 is a side elevation of the invention, a portion of the car being shown in section on line 2—2 of Fig. 1; and Fig. 3 is a detail view of the signal arms in three different positions.

Like numerals desginate like parts in each of the several views.

Referring to Figs. 1 and 2 of the drawings, the invention is shown applied to the car, the numeral 1 designating the front portion of the roof of the car, the numeral 3 the windshield and the numeral 17 the instrument board. Mounted on or over the central front portion of the roof of the car is a suitable plate 2 which carries a reflector 6 within which is mounted the electric bulb which illuminates the signal arms at night. In front of the bulb 5 I provide a suitable upright post or arm 7 to which is attached a bolt 8 which functions as a pivot member for the pair of signal arms 9 and 12. The right hand signal arm 9 is connected by a wire or rod 10 with the right hand operating handle 11; while the left hand signal arm 12 is connected by a wire or rod 13 with the left hand operating handle 14. The metal plate 2 is suitably apertured to permit the rods 10 and 13 to operate through same. The operating handles 11 and 14 are pivotally mounted on the bolt or pivot member 15. I provide a plate 16 on the instrument board immediately back of the handles 11 and 14 bearing appropriate desigations such as the letters "R" and "L" to indicate which handle operates the right hand signal and which handle operates the left hand signal. Electric bulb 5 is grounded by means of bracket 4 and is connected with electric conduits 18, electric switch 19 and thence by electric conduit 20 with the battery 21 and from the battery through conduit 22 to the ground 23.

The signal arm 9 and the operating handle 11 are connected by a rod or wire of suitable length so that the signal arm 9 and the operating handle 11 will be in a correspondingly similar position at all times, thus if the handle 11 is in a horizontal position the signal arm 9 will be in a horizontal position; or if the handle 11 is moved to a substantially vertical position, the signal arm 9 will also be in a substantially vertical position. The signal arm 12 and the operating handle 14 are connected in a similar manner, thus if the handle 14 is raised to a 45 degree angle relative to horizontal, the signal arm 12 will be raised to a similar angle.

An especially important feature of the invention is that the signalling arms are positioned on top of the roof of the car where they can be readily seen by drivers from all directions. Means for illuminating them, namely the electric light 5 and reflector 6 are also provided so that they may be readily seen at night.

It will also be noted that the signal arms are manually controlled and are not dependent on the electrical operation. It will also be noted that the operating handles are positioned on the instrument board where they may be conveniently operated by the driver of the car and that a single direct connection is provided between the operating handle and the corresponding signal arm.

What I claim is:—

1. In a signal device for automobiles, the combination of a post mounted on the roof of the car, a pair of signal arms pivotally mounted on said post, a pair of pivotally mounted operating handles positioned on the instrument board of the car and a rod connecting each handle with the corresponding signal arm for their simultaneous operation.

2. In a signal device for automobiles, the combination of a post mounted on the roof of the car, a pair of signal arms pivotally mounted on said post, a pair of pivotally mounted operating handles positioned on the instrument board of the car, a rod connecting each handle with the corresponding signal arm, a metal plate on which the aforesaid post is mounted, a reflector positioned back of the post and arranged to reflect light on the signal arms, and illuminating means positioned in front of the reflector.

3. A signal device for automobiles mounted on the top of automobiles and visible in all directions, comprising a post mounted on the front central portion of the automobile substantially over the instrument board; a pair of signal arms pivotally mounted to said post and adapted to be swung to either horizontal, vertical or angular positions; means mounted on the instrument board of the car directly connected with said signalling arms for manually operating same; and means mounted on the top of the car for illuminating the signal arms at night.

4. A signal device for automobiles mounted on the top of automobiles and visible in all directions, comprising a post mounted on the front central portion of the automobile substantially over the instrument board; a pair of signal arms pivotally mounted to said post and adapted to be swung to either horizontal, vertical or angular positions; a signal designation plate mounted on the instrument board; a pair of pivotally mounted handles mounted on said plate, rods pivotally connecting each handle with the corresponding signal arm, said connecting means being of suitable length so that the signal arm and the operating handle will at all times occupy a corresponding position whereby the position of the operating handle will indicate to the driver the position of the signal arm to which it is operatively connected.

5. In combination with the device defined in claim 4, an apertured plate on the roof of the car through which the rods controlling the signal arms extend, an electric bulb positioned back of the signal device and a reflector for reflecting light on the signal device at night.

JOHN M. CLARK.